United States Patent
Zhou et al.

(10) Patent No.: US 10,363,803 B2
(45) Date of Patent: Jul. 30, 2019

(54) ENCAPSULATION ASSEMBLY AND FORMING METHOD THEREOF, AND VEHICLE WINDOW

(71) Applicant: SAINT-GOBAIN GLASS FRANCE, Courbevoie (FR)

(72) Inventors: Jun Zhou, Shanghai (CN); Ran Weng, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/039,703

(22) PCT Filed: Mar. 2, 2015

(86) PCT No.: PCT/CN2015/073495
§ 371 (c)(1),
(2) Date: May 26, 2016

(87) PCT Pub. No.: WO2015/149601
PCT Pub. Date: Oct. 8, 2015

(65) Prior Publication Data
US 2017/0136860 A1    May 18, 2017

(30) Foreign Application Priority Data

Mar. 31, 2014   (CN) ........................ 2014 1 0126136

(51) Int. Cl.
*B60J 10/265*   (2016.01)
*E06B 3/54*   (2006.01)
(Continued)

(52) U.S. Cl.
CPC ............. *B60J 10/265* (2016.02); *B60J 10/70* (2016.02); *B60R 13/04* (2013.01); *E06B 3/5454* (2013.01);
(Continued)

(58) Field of Classification Search
CPC ....... B60J 10/265; B60J 10/70; E06B 3/5807; E06B 3/5454; B60Y 2410/122
(Continued)

(56) References Cited

U.S. PATENT DOCUMENTS 4,139,234 A * 2/1979 Morgan ..................... B60J 1/10
                                                                160/371
4,292,354 A   9/1981 Katoh
(Continued)

FOREIGN PATENT DOCUMENTS

CN          101177115 A       5/2008
CN          101734207 A       6/2010
(Continued)

OTHER PUBLICATIONS

First Office Action as issued in Chinese Patent Application No. 201410126136.7, dated Sep. 26, 2016.
(Continued)

*Primary Examiner* — Joseph D. Pape
*Assistant Examiner* — Dana D Ivey
(74) *Attorney, Agent, or Firm* — Pillsbury Winthrop Shaw Pittman LLP

(57) ABSTRACT

An encapsulation assembly and a forming method thereof, and a vehicle window are provided. The method includes: forming a trim which includes a decoration section and a connection section with a penetration structure formed therein; and forming a gasket which includes a fixing section covering the connection section of the trim, wherein a part of the fixing section is filled into the penetration structure of the connection section. The encapsulation assembly includes: a trim which includes a decoration section and a connection section with a penetration structure formed therein; and a gasket which includes a fixing section covering the connection section of the trim, wherein a part of the
(Continued)

fixing section is filled into the penetration structure of the connection section. The vehicle window includes a piece of glass and the above encapsulation assembly. A part of the fixing section of the gasket can be filled into the penetration structure. When the fixing section of the gasket covers the connection section of the trim, the fixing section can be fixed with the connection section of the trim through the penetration structure, such that a more stable connection between the fixing section and the trim can be achieved, which may increase the service life of the encapsulation assembly.

16 Claims, 2 Drawing Sheets

(51) Int. Cl.
*E06B 3/58* (2006.01)
*B60J 10/70* (2016.01)
*B60R 13/04* (2006.01)

(52) U.S. Cl.
CPC ....... *E06B 3/5807* (2013.01); *B60Y 2410/122* (2013.01)

(58) Field of Classification Search
USPC ...................................... 296/96.21
See application file for complete search history.

(56) References Cited

U.S. PATENT DOCUMENTS

| | | | |
|---|---|---|---|
| 4,986,594 A | 1/1991 | Gold et al. | |
| 5,688,016 A | 11/1997 | Gold | |
| 2012/0153659 A1* | 6/2012 | Senge | B60J 10/02 296/93 |
| 2014/0265422 A1* | 9/2014 | Medina | B60J 10/02 296/96.21 |

FOREIGN PATENT DOCUMENTS

| | | |
|---|---|---|
| CN | 201769660 U | 3/2011 |
| CN | 102143864 A | 8/2011 |
| DE | 43 39 033 A1 | 5/1995 |
| FR | 1 087 464 A | 2/1955 |
| JP | H56-164817 U | 12/1981 |
| JP | H59-165215 U | 11/1984 |
| JP | S61-129321 A | 6/1986 |
| JP | H01-249514 A | 10/1989 |
| JP | 2005-088652 A | 4/2005 |
| JP | 2013-542122 A | 11/2013 |
| KR | 10-0130584 B1 | 11/1997 |
| WO | WO 2006/064370 A2 | 6/2006 |

OTHER PUBLICATIONS

International Search Report and the Written Opinion of the International Searching Authority as issued in International Patent Application No. PCT/CN2015/073495, dated May 27, 2015.
Office Action as issued in Chinese Patent Application No. 201410126136.7, dated Feb. 21, 2017.
Office Action as issued in Chinese Patent Application No. 201410126136.7, dated Jul. 18, 2017.
Notice of Preliminary Rejection as issued in Korean Patent Application No. 10-2016-7015061, dated Jun. 19, 2017.
Office Acton as issued in Japanese Patent Application No. 2016-537967, dated Jun. 6, 2017.
Office Action as issued in Chinese Patent Application No. 201410126136.7, dated Feb. 11, 2018.
Office Action as issued in Japanese Patent Application No. 2016-537967, dated Oct. 24, 2017.

* cited by examiner

```
┌─────────────────────────────────────────────┐
│ a trim, which includes a decoration         │  S1
│ section and a connection section with a     │
│ penetration structure formed therein, is    │
│ formed                                      │
└─────────────────────────────────────────────┘
                      │
┌─────────────────────────────────────────────┐
│ a gasket, which includes a fixing section   │  S2
│ covering the connection section of the trim,│
│ is formed, wherein a part of the fixing     │
│ section is filled into the penetration      │
│ structure of the connection section         │
└─────────────────────────────────────────────┘
```

FIG. 1

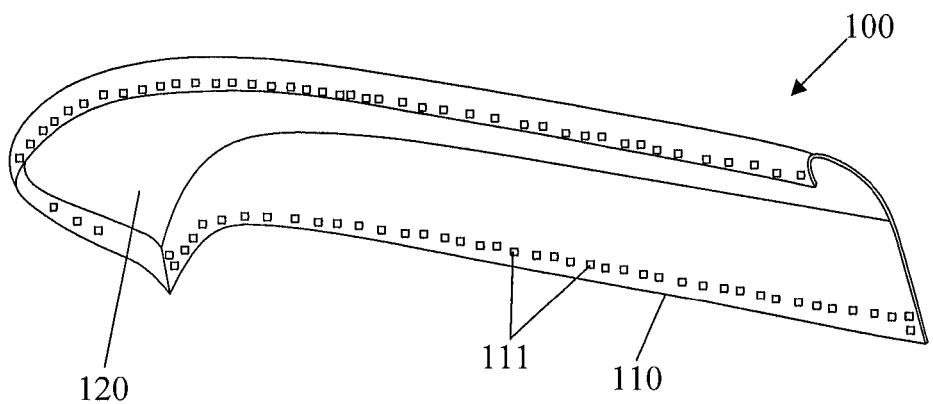

FIG. 2

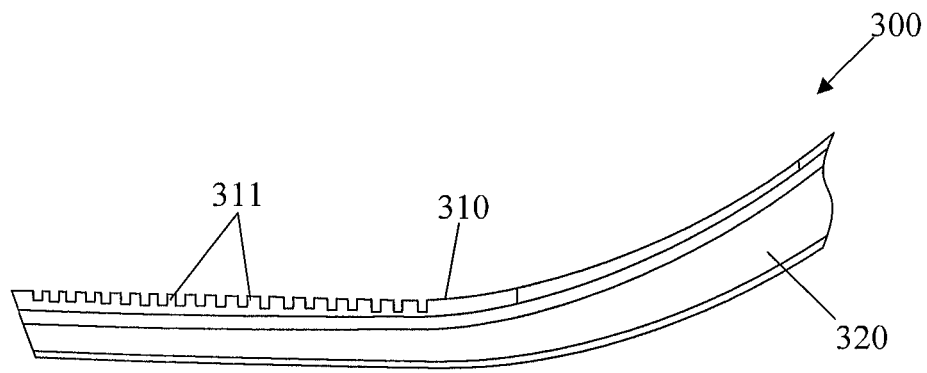

FIG. 3

ENCAPSULATION ASSEMBLY AND FORMING METHOD THEREOF, AND VEHICLE WINDOW

CROSS-REFERENCE TO RELATED APPLICATIONS

This application is the national phase of International Application No. PCT/CN2015/073495, filed on Mar. 2, 2015, which claims the benefit of priority to Chinese Patent Application No. 201410126136.7, filed on Mar. 31, 2014, and entitled "ENCAPSULATION ASSEMBLY AND FORMING METHOD THEREOF, AND VEHICLE WINDOW", the entire disclosures of which is are incorporated herein by reference.

TECHNICAL FIELD

The present disclosure generally relates to vehicle field, and more particularly, to an encapsulation assembly and a forming method thereof, and a vehicle window.

BACKGROUND

Generally, a vehicle window is required to well match with a bodywork opening of a vehicle, so as to obtain good sealing effect. Therefore, normally there is an encapsulation assembly disposed between the vehicle window and the bodywork of the vehicle, such that gaps between them can be sealed by the encapsulation assembly and good sealing effect can be achieved.

Further, to improve the aesthetics of the encapsulation assembly, the encapsulation assembly is always equipped with a trim. Thus, an existing encapsulation assembly generally includes a trim for decoration purposes and a sealing part. The sealing part not only seals gaps between a window and a bodywork of a vehicle, but also supports the trim.

In existing techniques, as the trim and the sealing part are normally made by different materials, in order to achieve stable connection between the trim and the sealing part, an over-molding process is required to form the encapsulation assembly.

However, in the existing encapsulation assembly, some portions of the trim may not be well fixed with the sealing part. For example, some portions of the sealing part may have a thickness less than other portions, and thus are prone to deform under gravity. Those deformations may impact the aesthetics. Performance and service life of the encapsulation assembly will also be affected. Besides, as thermal expansion coefficients of the trim and the sealing part are different, sometimes, the trim may peel off from the sealing part.

SUMMARY

An encapsulation assembly and a forming method thereof, and a vehicle window are required, such that a more stable connection between a gasket and a trim in the encapsulation assembly can be achieved, which may increase the service life of the encapsulation assembly.

In one aspect, a method for forming an encapsulation assembly is provided. The method includes: forming a trim which includes a decoration section and a connection section with a penetration structure formed therein; and forming a gasket which includes a fixing section covering the connection section of the trim, wherein a part of the fixing section is filled into the penetration structure of the connection section.

A basic idea is that a part of the fixing section of the gasket can be filled into the penetration structure. When the fixing section of the gasket covers the connection section of the trim, the fixing section can be fixed with the connection section of the trim through the penetration structure, such that a more stable connection between the fixing section and the trim can be achieved, which may ensure the reliability of the encapsulation assembly and increase the service life of the encapsulation assembly.

Further, the connection section of the trim is formed with the penetration structure, for example, formed with a hole structure or a tooth structure. Such penetration structures can be easily formed. In some embodiments, if the trim is made of metal, the hole structure or the tooth structure can be formed by a stamping process. In some embodiments, if the trim is formed by an injection molding process, the hole structure or the tooth structure can be directly formed in the injection molding process.

Further, diameters of through-holes in the hole structure or a distance between each pair of neighboring teeth in the tooth structure may be not less than 0.5 millimeters, such that the fixing section of the gasket can be easily filled into the through-holes or the teeth intervals during an over-molding process.

In another aspect, an encapsulation assembly is provided. The encapsulation assembly includes: a trim which includes a decoration section and a connection section with a penetration structure formed therein; and a gasket which includes a fixing section covering the connection section of the trim, wherein a part of the fixing section is filled into the penetration structure of the connection section.

A basic idea is that a part of the fixing section of the gasket can be filled into the penetration structure. When the fixing section of the gasket covers the connection section of the trim, the fixing section can be fixed with the connection section of the trim through the penetration structure, such that a more stable connection between the fixing section and the trim can be achieved, which may ensure the reliability of the encapsulation assembly and increase the service life of the encapsulation assembly.

In another aspect, a vehicle window is provided. The vehicle window includes a piece of glass and the above encapsulation assembly.

A basic idea is that a more stable connection between the gasket and the trim can be achieved, which may ensure the reliability of the encapsulation assembly and increase the service life of the vehicle window.

BRIEF DESCRIPTION OF THE DRAWINGS

FIG. 1 schematically illustrates a flow chart of a method for forming an encapsulation assembly according to an embodiment of the present disclosure;

FIGS. 2 and 3 schematically illustrate two different structural diagrams of a trim in S1 in FIG. 1;

DETAILED DESCRIPTION

Figure 4:
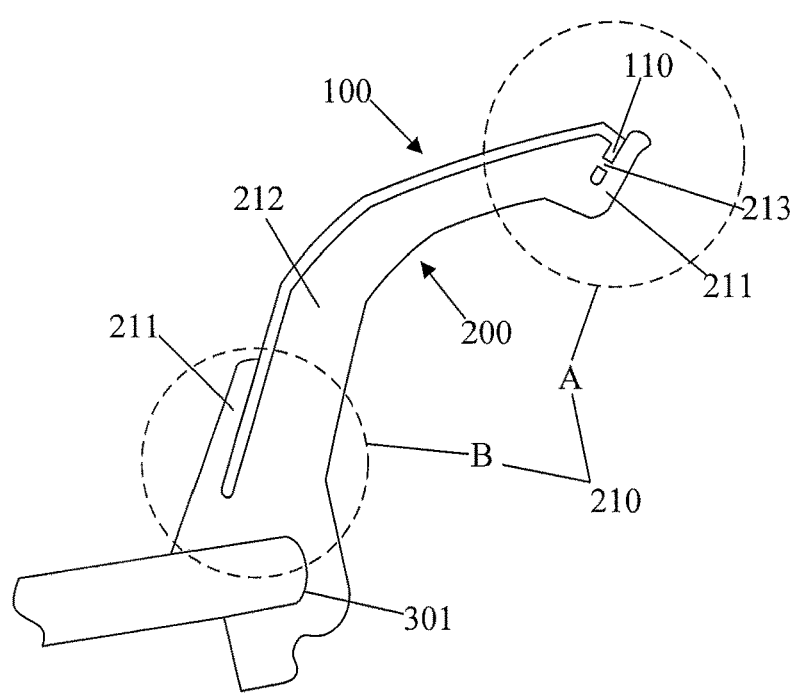
FIG. 4 schematically illustrates a structural diagram of an encapsulation assembly according to an embodiment of the present disclosure.

The above objects, characteristics and advantages of the disclosure may be better understood by referring to the following description in conjunction with accompanying figures.

In embodiments of the present disclosure, methods for forming an encapsulation assembly are provided. FIG. 1 schematically illustrates a flow chart of a method for forming an encapsulation assembly according to an embodiment of the present disclosure. Referring to FIG. 1, the method includes S1 and S2.

In S1, a trim, which includes a decoration section and a connection section with a penetration structure formed therein, is formed.

In S2, a gasket, which includes a fixing section covering the connection section of the trim, is formed, wherein a part of the fixing section is filled into the penetration structure of the connection section.

In the above method, a part of the fixing section of the gasket is filled into the penetration structure of the connection section, such that the fixing section of the gasket can be fixed with the connection section of the trim through the penetration structure, and further a more stable connection between the fixing section of the gasket and the connection section of the trim can be achieved, which may ensure the reliability of the encapsulation assembly, increase the service life of the encapsulation assembly, and reduce the possibility of the trim peeling off from the gasket.

FIG. 2 schematically illustrates a structural diagram of the trim in S1 in FIG. 1. Referring to FIGS. 1 and 2, in S1, a trim 100, which includes a decoration section 120 and a connection section 110 with penetration structures 111 formed therein, is formed.

As used for decorative purpose, the decoration section 120 is exposed without being covered by a gasket.

The connection section 110 is mainly formed for being fixed with the gasket. To enable the trim 100 to be well fixed with the gasket, the connection section 110 is disposed at an edge of the trim 100 for being covered by a fixing section of the gasket.

The penetration structures 111 are formed in the connection section 110 to make a connection between the gasket and the connection section 110 of the trim 100 more stable. In some embodiments, in a subsequent process for forming the gasket, a part of the gasket can be filled into the penetration structures 111, such that the connection section 110 of the trim 100 is connected with the gasket more stably. In some embodiments, the penetration structures 111 may be hole structures including a plurality of square through-holes as shown in FIG. 2.

In some embodiments, the trim 100 may be made of metal. Metal generally has a beautiful metallic luster and good extensibility, thus, it is easy to be processed to have various shapes.

In some embodiments, the trim 100 may include aluminum alloy. The aluminum alloy is relatively light, and has low cost, good extensibility, good anti-corrosion properties and good anti-oxidation properties.

It should be noted that, in some embodiments, a material of the trim 100 may be other metals, for example, stainless steel, and is not limited in embodiments of the present disclosure.

In some embodiments, the trim 100 made of metal may be formed by a stamping process. During the stamping process, a stamping tool which has a shape corresponding to through-holes may be used to form the hole structures 111 on the connection section 110 of the trim 100. For example, a stamping tool whose cross section is a square may be used to form the hole structures 111 including square through-holes on the connection section 110 of the trim 100, or a stamping tool whose cross section is a circle may be used to form the hole structures 111 including circular through-holes on the connection section 110 of the trim 100. In embodiments of the present disclosure, the trim 100 is easily formed without any extra manufacturing process.

In some embodiments, to enable a part of the gasket to be easily filled into the penetration structures 111 in a subsequent process for forming the gasket, diameters of the through-holes in the hole structures may be not less than 0.5 millimeters. Referring to FIG. 2, the through-holes have square shapes, thus, each side of the through-holes is not less than 0.5 millimeters. If the through-holes are rectangular, short sides of the through-holes should be not less than 0.5 millimeters. If the through-holes are triangular, short sides of the through-holes should be not less than 0.5 millimeters.

It should be noted that, sizes of the penetration structures 111 may be determined based on a process for forming the gasket and a size of the trim, and are not limited in embodiments of the present disclosure.

In some embodiments, the more penetration structures 111 are formed in the connection section 110, the more material will be filled into the penetration structures 111 in the subsequent process for forming the gasket, and the connection between the fixing section and the connection section 110 of the trim 100 is more stable. In practical processes, the number and positions of the penetration structures 111 may be determined based on the size of the trim and the diameters of the through-holes, and are not limited in embodiments of the present disclosure.

In some embodiments, the trim 100 may be made of a non-metal material, such as plastic. Accordingly, the trim 100 may be formed by an injection molding process. During the injection molding process, a slider which has a shape corresponding to a shape of the penetration structures 111 may be used at the connection section 110, to form the trim 100, which does not cause extra manufacturing process or difficulty.

It should be noted that, although the penetration structures 111 take the form of square through-holes in FIG. 2, in some embodiments, the penetration structures 111 may be other hole structures or structures other than holes, such as hole structures including circular through-holes or triangular through-holes.

FIG. 3 schematically illustrates another structural diagram of the trim 300 in S1 in FIG. 1. Referring to FIG. 3, different form FIG. 2, penetration structures 311 of a trim 300 are tooth structures located at an edge of a connection section 310.

The trim 300 may be made of metal. A toothy stamping tool may be enabled to move along an edge of the connection section 310 which is away from a decoration section 320, to remove a portion of the metal at the edge of the connection section 310 to form the tooth structures.

In some embodiments, to enable a part of a gasket 200 to be easily filled into the penetration structure 311 in a subsequent process for forming the gasket 200, a distance between each pair of neighboring teeth is not less than 0.5 millimeters.

In some embodiments, a great number of penetration structures 311 may be formed, such that more portions of the gasket 200 can be filled into the penetration structures 311 and further a connection between the gasket 200 and the trim 300 is more stable. The number of the penetration structures 311 may be determined based on practical situations, and is not limited here.

Figure 5:
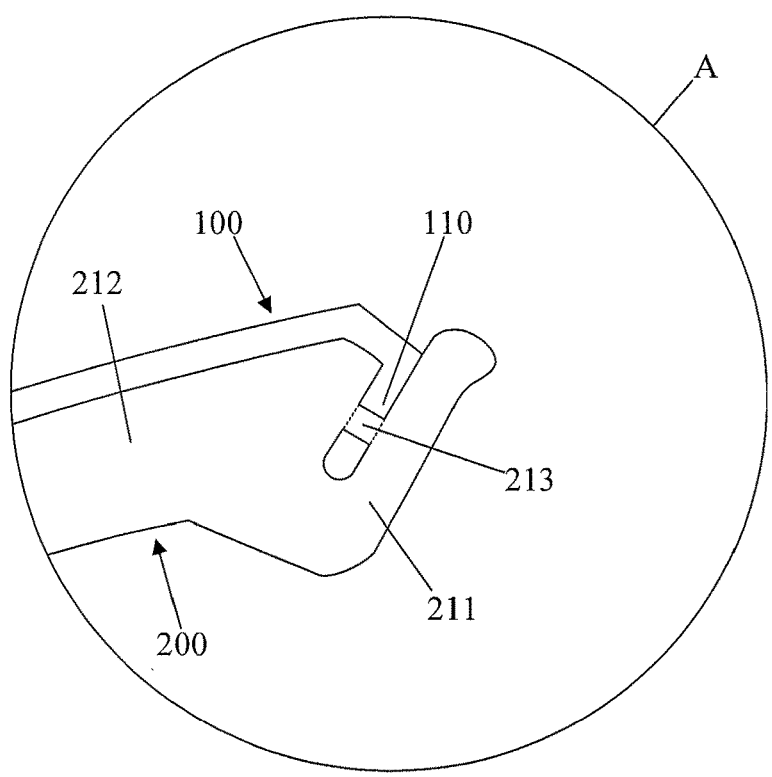
FIG. 5 schematically illustrates an enlarged view of an A region in FIG. 4.

FIG. 4 schematically illustrates a structural diagram of the encapsulation assembly in use which includes the encapsulation 200 and the trim 100 according to an embodiment of the present disclosure, and FIG. 5 schematically illustrates an enlarged view of an A region shown with a dotted box in FIG. 4. Referring to FIGS. 1, 4 and 5, in S2, the encapsulation 200, which includes a fixing section 210 covering the connection section 110 of the trim 100, is formed, wherein a part of the fixing section 210 is filled into the penetration structures 111 of the connection section 110.

In some embodiments, the gasket 200 may include polyvinyl chloride (PVC) which is relatively solid and has good anti-corrosion properties. In some embodiments, the gasket 200 may be made of other materials, such as thermoplastic elastomer (TPE), which is not limited in embodiments of the present disclosure.

In some embodiments, the gasket 200 may be formed by an injection molding process. During the injection molding process, a liquid injection material may be easily filled into the penetration structures 111.

In some embodiments, the gasket 200 may have lips. Referring to FIG. 4, the gasket 200 includes a first lip 211, a second lip 212 and a fixing part 213 shown with dotted boxes A and B.

The first lip 211 covers a portion of a first surface of the trim 100 which surface is used for decorative purpose and covers the connection section 110 of the trim 100. The first lip 211 may have a relatively small thickness, which is not limited in embodiments of the present disclosure.

The second lip 212 is connected with the first lip 211 and disposed on a second surface of the trim 100 which is opposite to the first surface. The second lip 212 also covers the connection section 110. In some embodiments, the second lip 212 serves as a supporting part in the whole encapsulation assembly, thus, it has a relatively great thickness, which is not limited in embodiments of the present disclosure.

The fixing part 213 is adapted to accommodate with the connection section 110 of the trim 100 to enable the gasket 200 to be fixed with the trim 100.

In some embodiments, as the penetration structures 111 are formed in the connection section 110 of the trim 100, an injection material can enter the penetration structures 111 when the gasket 200 is formed, such that the penetration structures 111 are filled with the injection material to form the fixing part 213.

The fixing part 213 is connected with the first lip 211 and the second lip 212, so as to fix the first lip 211 and the second lip 212 together, which may reduce the possibility of deformation of the first lip 211 which has a relatively small thickness and further decrease the possibility of the first lip 211 peeling off from the trim 100.

In above embodiments, the gasket 200 is formed by the injection molding process, thus, the first lip 211, the second lip 212 and the fixing part 213 are formed simultaneously. In some embodiments, a groove 301 for accommodating a piece of glass may be formed in a joint part of the first lip 211 and the second lip 212.

Accordingly, in an embodiment, an encapsulation assembly is provided. Still referring to FIG. 2, the encapsulation assembly includes: a trim 100 which includes a decoration section 120 and a connection section 110 with penetration structures 111 formed therein, wherein the decoration section 120 as used for decorative purpose is exposed without being covered by a gasket; and a gasket which includes a fixing section covering the connection section 110 of the trim 100, wherein a part of the fixing section is filled into the penetration structure 111 of the connection section 110. The gasket is fixed with the connection section 110 of the trim 100 through the part of the fixing section which is filled into the penetration structure 111, which may reduce the possibility of the trim 100 peeling off from the gasket, ensure the reliability of the encapsulation assembly, and increase the service life of the encapsulation assembly.

In some embodiments, the connection section 110 is mainly for being fixed with the gasket. To enable the trim 100 to be well fixed with the gasket, the connection section 110 is located at an edge of the trim 100 for being covered by the fixing section of the gasket.

In some embodiments, the trim 100 may be made of metal, such as stainless steel or aluminum alloy. In some embodiments, the trim 100 may include other materials, such as plastic, which is not limited in embodiments of the present disclosure.

In some embodiments, the penetration structures 111 may be hole structures including quadrate through-holes, which is not limited in embodiments of the present disclosure. In some embodiments, the penetration structures 111 may be hole structures including through-holes having other shapes or other structures, such as hole structures including circular through-holes or triangular through-holes.

The trim in FIG. 3 is different from that in FIG. 2. Referring to FIG. 3, penetration structures 311 of a trim 300 are tooth structures located at an edge of a connection section 310 which is away from a decoration section 320.

In some embodiments, to enable a part of a gasket 200 to be easily filled into the penetration structure 311 in a subsequent process for forming the gasket 200, a distance between each pair of neighboring teeth is not less than 0.5 millimeters.

In some embodiments, a great number of penetration structures 311 may be formed, so that more portions of the gasket 200 can be filled into the penetration structures 311 and further a connection between the gasket 200 and the trim 300 is more stable. The number of the penetration structures 311 may be determined based on practical situations, and is not limited in embodiments of the present disclosure.

For example, in the hole structures including square through-holes in FIG. 2, each side may be not less than 0.5 millimeters.

For another example, in the tooth structures in FIG. 3, a distance between each pair of neighboring teeth may be not less than 0.5 millimeters.

Still referring to FIGS. 4 and 5, in some embodiments, the gasket 200 includes a first lip 211, a second lip 212 and a fixing part 213.

The first lip 211 covers a portion of a first surface of the trim 100 which surface is used for decorative purpose and covers the connection section 110 of the trim 100. The first lip 211 may have a relatively small thickness, which is not limited in embodiments of the present disclosure.

The second lip 212 is connected with the first lip 211 and disposed on a second surface of the trim 100 which is opposite to the first surface. The second lip 212 also covers the connection section 110. In some embodiments, the second lip 212 serves as a supporting part in the whole encapsulation assembly, thus, it has a relatively great thickness, which is not limited in embodiments of the present disclosure.

The fixing part 213 is adapted to accommodate with the connection section 110 of the trim 100 to enable the gasket 200 to be fixed with the trim 100.

In some embodiments, any one of the second lip 212, the fixing part 213 and the first lip 211 is a portion of the fixing section.

In some embodiments, a groove 301 for accommodating a piece of glass may be formed in a joint part of the second lip 212 and the first lip 211.

In some embodiments, the gasket 200 may include PVC which is solid and has good anti-corrosion properties. In some embodiments, the gasket 200 may be made of other materials, such as TPE, which is not limited in embodiments of the present disclosure.

It should be noted that, the encapsulation assembly may be formed by the methods provided in embodiments of the present disclosure, and may also be formed by methods other than those provided in the embodiments.

Besides, a vehicle window is provided. The vehicle window includes a piece of glass and the above encapsulation assembly disposed at an edge of the glass, wherein the encapsulation assembly includes a trim and a gasket around the trim.

The encapsulation assembly of the vehicle window may ensure a more stable connection between the gasket and the trim, such that the vehicle window may have a better appearance, a higher reliability and an increased service life.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure. Therefore, the protection scope of the present disclosure is subject to the scope defined by the claims.

What is claimed is:

1. A method for forming an encapsulation assembly, comprising:
    forming a trim which comprises a decoration section and a connection section, the connection section being disposed at an edge of the trim and having a penetration structure; and
    forming a gasket, by injection molding, which comprises a fixing section covering the connection section of the trim, wherein a part of the fixing section is filled into the penetration structure of the connection section during the injection molding,
    wherein forming the trim comprises forming a hole structure in the connection section so as to form the penetration structure.

2. The method of claim 1, wherein the trim is made of metal, and forming the trim comprises forming the penetration structure on the trim by a stamping process.

3. The method of claim 2, wherein the trim is made of stainless steel or aluminum alloy.

4. The method of claim 1, wherein the trim is made of plastic, and the trim is formed by injection molding.

5. The method of claim 1, wherein the hole structure comprises a plurality of through-holes formed in the connection section, and diameters of the plurality of holes are not less than 0.5 millimeters.

6. The method of claim 1, wherein the connection section of the trim is formed at an edge of the trim, and forming the gasket comprises:
    forming a first lip covering a first surface of the trim;
    forming a second lip which is connected with the first lip, and covers the connection section and a second surface of the trim; and
    forming a fixing part filled into the penetration structure, wherein the fixing part is connected with the first and second lips, wherein the second lip, the fixing part, and a portion of the first lip which is opposite to the second lip together constitute the fixing section.

7. The method of claim 6, wherein forming the gasket comprises:
    forming a groove for accommodating a piece of glass in a joint part of the first lip and the second lip.

8. The method of claim 1, wherein the gasket is made of polyvinyl chloride or thermoplastic elastomer.

9. An encapsulation assembly, comprising:
    a trim which comprises a decoration section and a connection section, the connection section being disposed at an edge of the trim and having a penetration structure; and
    a gasket, formed by injection molding, which comprises a fixing section covering the connection section of the trim, wherein a part of the fixing section is filled into the penetration structure of the connection section during the injection molding,
    wherein the penetration structure comprises a hole structure.

10. The encapsulation assembly of claim 9, wherein the trim is made of metal or plastic.

11. The encapsulation assembly of claim 9, wherein the trim is made of stainless steel or aluminum alloy.

12. The encapsulation assembly of claim 9, wherein the hole structure comprises a plurality of through-holes, and diameters of the plurality of through-holes are not less than 0.5 millimeters.

13. The encapsulation assembly of claim 9, wherein the connection section of the trim is disposed at an edge of the trim, and the gasket comprises:
    a first lip covering a first surface of the trim;
    a second lip, which is connected with the first lip, and covers the connection section and a second surface of the trim; and
    a fixing part filled into the penetration structure, wherein the fixing part is connected with the first and second lips, wherein the second lip, the fixing part, and a portion of the first lip which is opposite to the second lip together constitute the fixing section.

14. The encapsulation assembly of claim 13, wherein the gasket further comprises a groove for accommodating a piece of glass located in a joint part of the first lip and the second lip.

15. The encapsulation assembly of claim 9, wherein the gasket is made of polyvinyl chloride or thermoplastic elastomer.

16. A vehicle window, comprising:
    a piece of glass; and
    an encapsulation assembly according to claim 9, wherein the gasket of the encapsulation assembly is disposed at an edge of the glass.

* * * * *